(12) United States Patent
Guruswamy

(10) Patent No.: US 8,359,653 B2
(45) Date of Patent: *Jan. 22, 2013

(54) PORTABLE PROGRAM FOR GENERATING ATTACKS ON COMMUNICATION PROTOCOLS AND CHANNELS

(75) Inventor: Kowsik Guruswamy, Sunnyvale, CA (US)

(73) Assignee: Spirent Communications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,636

(22) Filed: Jun. 7, 2011

(65) Prior Publication Data
US 2011/0271348 A1 Nov. 3, 2011

Related U.S. Application Data

(63) Continuation of application No. 11/351,409, filed on Feb. 10, 2006, now Pat. No. 7,958,560.

(60) Provisional application No. 60/662,430, filed on Mar. 15, 2005.

(51) Int. Cl.
G06F 21/00 (2006.01)
G06F 11/30 (2006.01)
G06F 15/16 (2006.01)

(52) U.S. Cl. ............................ 726/25; 726/23; 709/224

(58) Field of Classification Search ........................ None
See application file for complete search history.

(56) References Cited

U.S. PATENT DOCUMENTS

| 5,067,104 A | 11/1991 | Krishnakumar et al. |
| 5,459,837 A | 10/1995 | Caccavale |
| 5,485,409 A | 1/1996 | Gupta et al. |
| 5,892,903 A | 4/1999 | Klaus |
| 6,088,804 A | 7/2000 | Hill et al. |
| 6,324,656 B1 | 11/2001 | Gleichauf et al. |
| 6,363,477 B1 | 3/2002 | Fletcher et al. |
| 6,574,737 B1 | 6/2003 | Kingsford et al. |
| 6,584,569 B2 | 6/2003 | Reshef et al. |
| 6,609,205 B1 | 8/2003 | Bernhard et al. |
| 6,654,914 B1 | 11/2003 | Kaffine et al. |
| 6,952,779 B1 | 10/2005 | Cohen et al. |
| 7,152,105 B2 | 12/2006 | McClure et al. |
| 7,159,151 B2 | 1/2007 | Morgan et al. |
| 7,178,166 B1 | 2/2007 | Taylor et al. |
| 7,185,232 B1 | 2/2007 | Leavy et al. |
| 7,243,148 B2 | 7/2007 | Keir et al. |
| 7,257,630 B2 | 8/2007 | Cole et al. |
| 7,272,650 B2 | 9/2007 | Elgebaly et al. |
| 7,290,145 B2 | 10/2007 | Falkenthros |
| 7,315,801 B1 | 1/2008 | Dowd et al. |
| 7,342,892 B2 | 3/2008 | Soon et al. |
| 7,346,922 B2 | 3/2008 | Miliefsky |

(Continued)

FOREIGN PATENT DOCUMENTS

WO 2006/099536 9/2006

OTHER PUBLICATIONS

Wagner, D. et al., "Intrusion Detection Via Static Analysis", IEEE Symposium on Security and Privacy, 2001, pp. 156-168.

(Continued)

*Primary Examiner* — Christopher Revak
(74) *Attorney, Agent, or Firm* — Haynes Beffel & Wolfeld; Ernest J. Beffel, Jr.

(57) ABSTRACT

A security analyzer is capable of generating attacks to test the security of a device under analysis. The security analyzer further has the capability to generate a portable, executable program to generate specified attacks. In this way, others can recreate the attacks without requiring access to the security analyzer.

23 Claims, 2 Drawing Sheets

U.S. PATENT DOCUMENTS

| | | | |
|---|---|---|---|
| 7,421,621 | B1 | 9/2008 | Zambrana |
| 7,447,966 | B2 | 11/2008 | Kamannavar et al. |
| 7,451,488 | B2 | 11/2008 | Cooper et al. |
| 7,471,999 | B2 | 12/2008 | Taki |
| 7,509,675 | B2 | 3/2009 | Aaron |
| 7,512,125 | B2 | 3/2009 | Betts et al. |
| 7,536,456 | B2 | 5/2009 | Williams et al. |
| 7,536,605 | B2 | 5/2009 | Keaffaber et al. |
| 7,543,056 | B2 | 6/2009 | McClure et al. |
| 7,574,740 | B1* | 8/2009 | Kennis ............... 726/22 |
| 7,607,170 | B2 | 10/2009 | Chesla |
| 7,624,422 | B2 | 11/2009 | Williams et al. |
| 7,627,891 | B2 | 12/2009 | Williams et al. |
| 7,627,900 | B1 | 12/2009 | Noel et al. |
| 7,664,845 | B2 | 2/2010 | Kurtz et al. |
| 7,673,043 | B2 | 3/2010 | Keir et al. |
| 7,774,637 | B1 | 8/2010 | Beddoe et al. |
| 7,954,161 | B1 | 5/2011 | Guruswamy et al. |
| 7,958,230 | B2 | 6/2011 | Guruswamy et al. |
| 7,958,560 | B1* | 6/2011 | Guruswamy ............... 726/25 |
| 8,095,982 | B1* | 1/2012 | Guruswamy ............... 726/25 |
| 8,095,983 | B2* | 1/2012 | Guruswamy ............... 726/25 |
| 2001/0034847 | A1 | 10/2001 | Gaul, Jr. |
| 2002/0157041 | A1 | 10/2002 | Bennett et al. |
| 2003/0051163 | A1 | 3/2003 | Bidaud |
| 2003/0154399 | A1 | 8/2003 | Zuk et al. |
| 2003/0159063 | A1 | 8/2003 | Apfelbaum et al. |
| 2003/0208616 | A1* | 11/2003 | Laing et al. ............... 709/236 |
| 2004/0001443 | A1 | 1/2004 | Soon et al. |
| 2004/0068586 | A1 | 4/2004 | Xie et al. |
| 2004/0068675 | A1 | 4/2004 | Liu |
| 2004/0103315 | A1 | 5/2004 | Cooper et al. |
| 2004/0205557 | A1 | 10/2004 | Bahrs et al. |
| 2004/0230881 | A1 | 11/2004 | Gwak |
| 2005/0015213 | A1 | 1/2005 | Somervill et al. |
| 2005/0044418 | A1 | 2/2005 | Miliefsky |
| 2005/0135391 | A1 | 6/2005 | Sung |
| 2005/0144137 | A1 | 6/2005 | Kumar et al. |
| 2005/0195820 | A1 | 9/2005 | Betts et al. |
| 2005/0248457 | A1 | 11/2005 | Himberger et al. |
| 2005/0273772 | A1 | 12/2005 | Matsakis et al. |
| 2005/0273854 | A1 | 12/2005 | Chess et al. |
| 2005/0273859 | A1 | 12/2005 | Chess et al. |
| 2006/0005231 | A1 | 1/2006 | Zuk et al. |
| 2006/0015941 | A1 | 1/2006 | McKenna |
| 2006/0015943 | A1 | 1/2006 | Mahieu |
| 2006/0021034 | A1* | 1/2006 | Cook ............... 726/22 |
| 2006/0021044 | A1* | 1/2006 | Cook ............... 726/25 |
| 2006/0021045 | A1 | 1/2006 | Cook |
| 2006/0021046 | A1* | 1/2006 | Cook ............... 726/25 |
| 2006/0021047 | A1* | 1/2006 | Cook ............... 726/25 |
| 2006/0021048 | A1* | 1/2006 | Cook et al. ............... 726/25 |
| 2006/0021049 | A1 | 1/2006 | Cook |
| 2006/0036755 | A1 | 2/2006 | Abdullah et al. |
| 2006/0080733 | A1 | 4/2006 | Khosmood et al. |
| 2006/0085723 | A1 | 4/2006 | Bartz et al. |
| 2006/0098579 | A1 | 5/2006 | Chang et al. |
| 2006/0106939 | A1 | 5/2006 | Cha et al. |
| 2006/0137009 | A1 | 6/2006 | Chesla |
| 2006/0277606 | A1 | 12/2006 | Yunus et al. |
| 2007/0006037 | A1 | 1/2007 | Sargusingh et al. |
| 2007/0011319 | A1 | 1/2007 | McClure et al. |
| 2007/0086389 | A1 | 4/2007 | Park et al. |
| 2007/0094728 | A1 | 4/2007 | Julisch et al. |
| 2007/0097963 | A1* | 5/2007 | Thermos ............... 370/352 |
| 2007/0115962 | A1 | 5/2007 | Mammoliti et al. |
| 2007/0174917 | A1 | 7/2007 | Guruswamy |
| 2007/0204347 | A1 | 8/2007 | Caceres et al. |
| 2007/0266426 | A1* | 11/2007 | Iyengar et al. ............... 726/5 |
| 2008/0005555 | A1 | 1/2008 | Lotem et al. |
| 2008/0072322 | A1 | 3/2008 | Guruswamy |
| 2008/0092237 | A1 | 4/2008 | Yoon et al. |
| 2008/0098479 | A1* | 4/2008 | O'Rourke et al. ............... 726/25 |
| 2008/0120283 | A1 | 5/2008 | Liu et al. |
| 2008/0155338 | A1 | 6/2008 | Rusmanov |
| 2008/0282352 | A1 | 11/2008 | Beddoe et al. |
| 2009/0083854 | A1 | 3/2009 | Bozanich et al. |
| 2009/0271863 | A1 | 10/2009 | Govindavajhala et al. |
| 2009/0320137 | A1 | 12/2009 | White et al. |
| 2009/0328190 | A1 | 12/2009 | Liu et al. |
| 2010/0106742 | A1 | 4/2010 | Guruswamy |
| 2010/0284282 | A1 | 11/2010 | Golic |
| 2010/0284283 | A1 | 11/2010 | Golic et al. |
| 2010/0293415 | A1 | 11/2010 | Beddoe et al. |

OTHER PUBLICATIONS

Finlay, I. et al., "Multiple Vulnerabilities in Many Implementations of the Simple Network Management Protocol (SNMP)", CERT® Advisory CA-2002-03, Pittsburgh, PA, US.

Griffin, J.L., "Testing Protocol Implementation Robustness", Published in the Proceedings of 29th Annual International Symposium on Fault-Tolerant Computing (FTC), Jun. 15-18, 1999, Madison, Wisconsin, US.

Kaksonen, R., "A Functional Method for Assessing Protocol Implementation Security", VTT Publications 448, 2011, 128 p.+app. 15p., Technical Research Centre of Finland, FI.

Kaksonen, R., "Software Security Assessment through Specification Mutations and Fault Injection", Proceedings of the Int'l Federation for Information Processing (IFIP), TC-6/TC-11 Fifth Joint Int'l Working Conference on Communications and Multimedia Security (CMS'01), May 21-22, 2001, Darmstadt, Germany, pp. 173-183.

Miller, B. et al., "Fuzz Revisited: A Re-examination of the Reliabiltiy of Unix Utilities and Services", Computer Sciences Department, Oct. 1995, pp. 1-23, Madison, Wisconsin, US.

PROTOS Test-Suite: c06-snmpvl, University of Oulu (ee.oulu.fi)—http://www.ee.oulu.fi/research/ouspg/protos/testing/c06/snmpvl/index, Oct. 17, 2002, pp. 1-26, Finland.

PROTOS Test Suite: c06Idapv3, University of Oulu (ee.oulu.fi)—http://www.ee.oulu.fi/research/ouspg/protos/testing/c06/Idapv3/index.html, Dec. 2001, p. 1-13, Finland.

Beddoe, M., "Network Protocol Analysis using Bioinformatics Algorithms", 2004, retrieved on May 17, 2007, from <URL: http://www.4tphi.net/~awalters/PI/pi.pdf>.

Case, J. et al., "A Simple Network Management Protocol (SNMP)" (RFC 1157), May 1990, retrieved on May 17, 2007, from <URL: http://www.faqs.org/rfcs/rfc1157.html>.

Marquis, S., et al., "SCL: A Language for Security Testing of Network Applications", Proceedings: 15th IBM Centre for Advanced Studies Conference (CASCON), Toronto, Canada, Oct. 2005, pp. 155-164, retrieved on May 17, 2007, from <URL: http://post.queensu.ca/~trd/research/papers/marquisSCL.pdf>.

McCloghrie K. et al., "Structure of Management Information Version 2 (SMIv2)" (RFC 2578), Apr. 1999, retrieved on May 17, 2007, from <URL: http://www.faqs.org/rfcs/rfc2578.html>.

Nevill-Manning, C. et al., "Identifying Hierarchical Structure in Sequences: A linear-time algorithm", Journal of Artificial Intelligence Research, vol. 7, Sep. 1997, pp. 67-82, retrieved on May 17, 2007, from <URL: http://arxiv.org/abs/cs/9709102>.

Tal, O. et al., "Syntax-based Vulnerability Testing of Frame-based Network Protocols", Proceedings: 2nd Annual Conference on Privacy, Security and Trust, Frederiction, Canada, Oct. 2004, pp. 155-160, retrieved on May 17, 2007, from <URL: http://post.queensu.ca/~trd/research/papers/FinalPST04.pdf>.

Turcotte, Y. et al., "Security Vulnerabilities Assessment of X.509 Protocol by Syntax-based Testing", Military Communications Conference (MILCOM), Monterey, CA, Oct. 2004, vol. 3, pp. 1572-1578, retrieved from <URL: http://post.queensu.ca/~trd/research/papers/MILCOM/pdf>.

Zhang, S. et al., "A Lightweigh Approach to State Based Security Testing", Proceedings: 16th IBM Centre for Advanced Studies Conference (CASCON), Toronto, Canada, Oct. 2006, Article No. 28, retrieved on May 17, 2007, from <URL: http://post.queensu.ca/~trd/research/papers/zhangState.pdf>.

Zhang, S. et al., "Applied Software Transformation Techniques to Security Testing", Proceedings: Software Technology and Engineering in Practice (STEP), Toronto, Canada, Oct. 2005, retrieved on May 17, 2007, from <URL: http://post.queensu.ca/~trd/research/papers/step2005.pdf>.

Aitel, D., "An Introduction to SPIKE, the Fuzzer Creation Kit" (presentation slides), Aug. 1, 2002, Black Hat USA, Las Vegas, NV, online, retrieved Jun. 26, 2007, from <URL: http://www.blackhat.com/presentations/bh-usa-02/bh-us-02-aitel-spike.ppt>.
Beddoe, M., "Heuristics for Packet Field Identification", Mu Security Research Labs blog, Jan. 4, 2007, online, retrieved Jun. 26, 2007, from <URL: http://labs.musecurity.com/2007/01/04/heuristics-for-packet-field-identification/>.
Beddoe, M., "The Protocol Informatics Project: Automating Network Protocol Analysis" (presentation slides), 2005.
Sonne, B., "Covert Channel detection using Bioinformatics Algorithms", nCircle 360 Security blog, May 11, 2006, online, retrieved on Jun. 26, 2007, from <URL: http://blog.ncircle.com/archives/2006/05/covert_channgel_detection_using.html>.
Beizer, B., "Chapter 9: Syntax Testing", in Software Testing Techniques, 2nd Ed., 1990, pp. 284-319, Van Nostrand Reinhold, New York, NY.
Beizer, B., "Chapter 8: Syntax Testing", in Black-Box Testing: Techniques for Functional Testing of Software and Systems, 1995, pp. 177-201, John Wiley & Sons, Inc., New York, NY.
Kaksonen, R. et al., "Vulnerability Analysis of Software through Syntax Testing", 2000, online, retrieved on Sep. 1, 2006, from <URL: http://www.ee.oulu.fi/research/ouspg/protos/analysis/WP2000-robustness/>.
Mu Security, "6 Degrees of Protocols", 2006.
Mu Security, "Protocol Vulnerability Patterns", Apr. 2006.
Rubin, S. et al., "On the Completeness of Attack Mutation Algorithms", 19th IEEE Computer Security Foundations Workshop (CSFW), Jul. 2006, 14 pages, Online, retrieved on Jan. 19, 2010, from <URL: http://pages.cs.wisc.edu/~jha/jha-papers/security/CSFW_2006.pdf>.
Turcotte, Y., "Syntax Testing of Communication Protocols for Security Vulnerabilities (Testing of a subset of the Entrust PKI)", Nov. 2003, online, retrieved on Sep. 1, 2006, from <URL: http://tarpit.rmc.ca/paul/EEE491A%20Fall%202003/Slides/EE491%20GL3%30Syntax%20Testing.ppt>.
Xiao, S. et al., "Integrated TCP/IP Protocol Software Testing for Vulnerability Detection", Proceedings of International Conference on Computer Networks and Mobile Computing (ICCNMC'03), Oct. 20-23, 2003, Shanghai, China, pp. 311-319.
Bellovin, S. "A Technique for Counting NATted Hosts", Proceedings: Second Internet Measurement Workshop (IMW), Marseille, France, Nov. 6-8, 2002, pp. 267-272.
Bradner, S. et al., "Benchmarking Methodology for Network Interconnect Devices (RFC_1944)", May 1996, online, retrieved on May 12, 2006, from <URL: http://rfc.net/rfc1944.html>.
Bradner, S. et al., Benchmarking Methodology for Network Interconnect Devices (RFC_2544), Mar. 1999, online, retrieved on May 12, 2006, from <URL: http://rfc.net/rfc2544.html>.
Cisco Systems, Inc., "Mobile IP—NAT Detect" in "Cisco IOS IP Mobility Configuration Guide, Release 12.4.", 2005, online, retrieved on May 12, 2006, from <URL: http://www.cisco.com/univercd/cc/td/doc/product/software/ios124/124cg/himo_c/ch05/hnatrav.pdf>.
Dunn, J. et. al., "Methodology for ATM Benchmarking (RFC 3116)", Jun. 2011, online, retrieved on May 12, 2006, from <URL: http://rfc.net/rfc3116.html>.
Egevang, K., et al., "The IP Network Address Translator (NAT) (RFC 1631)", May 1994, online, retrieved on May 12, 2006, from <URL: http://rfc.net/rfc3116.html>.
Microsoft Corp., "Overview of Network Address Translation (NAT) in Windows XP", Sep. 12, 2005, online, retrieved on May 12, 2006, from <URL: http://www.microsoft.com/technet/prodtechnol/winxppro/deploy/nattrnsw.mspx?pd=true>.
Netcom Systems, "SmartWindow User Guide Version 6 53", Document No. 340-1020-001 Rev C, Dec. 1999, online, retrieved on May 12, 2006, from <URL: https://www.cobra.ee.ntu.edu.tw/~oops/HTML6/08_exp/smartbit%20reading.pdf>.
Nikolic, M., "Performance Measurements of Multimedia Transmissions in IP over ATM Networks", Master's Thesis, School of Engineering Science, Simon Fraser University, Dec. 2002, online, retrieved on May 12, 2006, from <URL: http://142.58.111.30/~ljilja/cnl/pdf/milan.pdf>.
Sorensen, S., "Intrusion Detection and Prevention Protecting Your Network from Attacks", Document No. 200065-002, 2006, online, retrieved on May 12, 2006, from <URL: http://www.juniper.net/solutions/literature/white_papers/200065.pdf>.
Srisuresh, P. et al., "IP Network Address Translator (NAT) Terminology and Considerations (RFC 2663)", Aug. 1999, online, retrieved on May 12, 2006, from <URL: http://rfc/net/rfc2663.html>.
Srisuresh, P. et al., "Traditional IP Network Address Translator (Traditional NAT) (RFC 3022)", Jan. 2001, online, retrieved on May 12, 2006, from <URL: http://rfc.net/rfc3022.html>.
Trend Communications, "RFC 2544 Testing with Aurora Tango", date unknown, online, retrieved on May 12, 2006, from <URL: http://www.trendtest.co.uk/trendweb/resource.nsf/vIFileURL-Lookup/en%5E%5ERFC+2544+testing/$File/GbEnet.2544.test.pdf>.
Udupa, R. et al., "Performance Issues and Evaluation Techniques for Networking Devices", 2001, online, retrieved on May 12, 2006, from URL: http://softwaredioxide.com/Channels/events/testing2001/Presentations/raghavendra_infosys.pdf>.
PCT International Search Report and Written Opinion, PCT/US06/09512, Aug. 31, 2006.
Wikipedia.com, Active Directory, http://en.wikipedia.org/wiki/Tunneling_protocol.
Wikipedia.com, Active Directory, http://en.wikipedia.org/wiki/Session_initiation.
Gordano.com, What is the SMPT/EHLO clause.
U.S. Appl. No. 11/514,809, filed Sep. 1, 2006.
U.S. Appl. No. 11/859,691, filed Sep. 21, 2007.
U.S. Appl. No. 11/351,402, filed Feb. 10, 2006.
U.S. Appl. No. 11/696,605, filed Apr. 4, 2007.
U.S. Appl. No. 13/153,797, filed Jun. 6, 2011.
U.S. Appl. No. 11/760,600 filed Jun. 8, 2007.

* cited by examiner

PORTABLE PROGRAM FOR GENERATING ATTACKS ON COMMUNICATION PROTOCOLS AND CHANNELS

PRIORITY CLAIM AND REFERENCE TO RELATED APPLICATIONS

The present application is a continuation of application Ser. No. 11/351,409 filed on Feb. 10, 2006 now U.S. Pat. No. 7,958,560 and claims priority to said application under 35 U.S.C. §120. The entire contents of the original disclosure of said application is expressly incorporated herein in its entirety by reference thereto. Application Ser. No. 11/351,409, now U.S. Pat. No. 7,958,560, claims priority from the following provisional application, which is hereby incorporated by reference in its entirety: U.S. Application No. 60/662,430, filed on Mar. 15, 2005, entitled "Automated Robustness and Security Testing of Network Devices". This application is related to the following utility applications, which are hereby incorporated by reference in their entirety: U.S. application Ser. No. 11/351,403, filed on Feb. 10, 2006, entitled "Platform for Analyzing the Security of Communication Protocols and Channels" now U.S. Pat. No. 8,095,983 and U.S. application Ser. No. 11/351,402, filed on Feb. 10, 2006, entitled "Analyzing the Security of Communication Protocols and Channels for a Pass-Through Device", now U.S. Pat. No. 8,095,982.

BACKGROUND

The present invention relates to a security analyzer that attacks a device by sending messages to it.

Computerized communication, whether it occurs at the application level or at the network level, generally involves the exchange of data or messages in a known, structured format (a "protocol"). Software applications and hardware devices that rely on these formats can be vulnerable to various attacks that are generally known as "protocol abuse." Protocol abuse consists of sending messages that are invalid or malformed with respect to a particular protocol ("protocol anomalies") or sending messages that are well-formed but inappropriate based on a system's state. Messages whose purpose is to attack a system are commonly known as malicious network traffic.

A proactive solution to the attack problem is to analyze a system ahead of time to discover or identify any vulnerabilities. This way, the vulnerabilities can be addressed before the system is deployed or released to customers. This process, which is known as "security analysis," can be performed using various methodologies. One methodology for analyzing the security of a device-under-analysis (DUA) is to treat the DUA as a black box. Under this methodology, the DUA is analyzed via the interfaces that it presents to the outside world. For example, a security analyzer sends one or more messages (test messages) to the DUA, and the DUA's response is observed. A response can include, for example, registering an error or generating a message (response message). The DUA can then send the generated message to the security analyzer. Depending on the analysis being performed, the security analyzer might send another message to the DUA upon receiving the message from the DUA.

If the security analyzer discovers a vulnerability in the DUA, the vulnerability can be addressed by the DUA's development team. The development team will likely want to observe the vulnerability first-hand by recreating the attack on the DUA. One solution is to use the security analyzer to recreate the attack. However, since the security analyzer has many capabilities beyond generating merely one attack, using the security analyzer for this task would be a poor use of resources. In addition, the development team may not have access to the security analyzer, for example if the analysis team is at a different location than the development team, and purchasing a separate security analyzer for the development team may not be a good use of resources. Another solution is to recreate the attack manually, by creating the messages and sending them to the DUA. However, this is a tedious and error-prone process. What is needed is a way to recreate the attack easily but without using the security analyzer.

SUMMARY

The present invention overcomes limitations of the prior art by providing a security analyzer for analyzing a security of a device under analysis (DUA). In one embodiment, the security analyzer is an appliance that is capable of generating attacks to test the security of a device under analysis. The appliance further has the capability to generate a portable, executable program to generate specified attacks. In this way, others can recreate the attacks without requiring access to the appliance.

In another aspect, a method for testing the security of a device under analysis (DUA) includes the following steps. Attack(s) are generated to probe the security of the DUA. Based on the attacks, certain security vulnerabilities may be identified. Corresponding executable programs are generated that, when executed, will recreate the attack(s).

Other aspects of the invention include software, systems, components and methods corresponding to the above, and applications of the above for purposes other than security analysis.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

A security analyzer tests a device-under-analysis (DUA) by sending one or more test messages to the DUA, possibly receiving one or more response messages from the DUA, and then possibly continuing the message exchange with the DUA. Recreating an attack, therefore, would include sending one or more messages to the DUA, possibly receiving one or more messages from the DUA, and then possibly sending more messages back and forth to the DUA. The security analyzer could be used to do this, but this often is not a good use of the security analyzer.

Instead, in one embodiment, the attack is recreated by running an executable program. The program is stand-alone, in that it can be run without the security analyzer being present. The program is also portable, such that it can be transferred easily and run on various devices. The program also hides some of the security analyzer's internals, which makes the program easier to use and helps protect any proprietary information that is used inside the security analyzer.

In one approach, the security analyzer itself is used to generate the executable program. For example, the security analyzer may be a portable appliance that can be transported to different locations to analyze the security of different devices. The analysis team may be operating the security analyzer to test a DUA when they identify a security vulnerability. They want the development team to be able to recreate the attack that led to the vulnerability but the development team may not have access to a security analyzer. Therefore, the analysis team uses the security analyzer to generate an executable program that can generate the attack. The analysis team then gives this program to the development team, which can then generate the attack.

Figure 1:
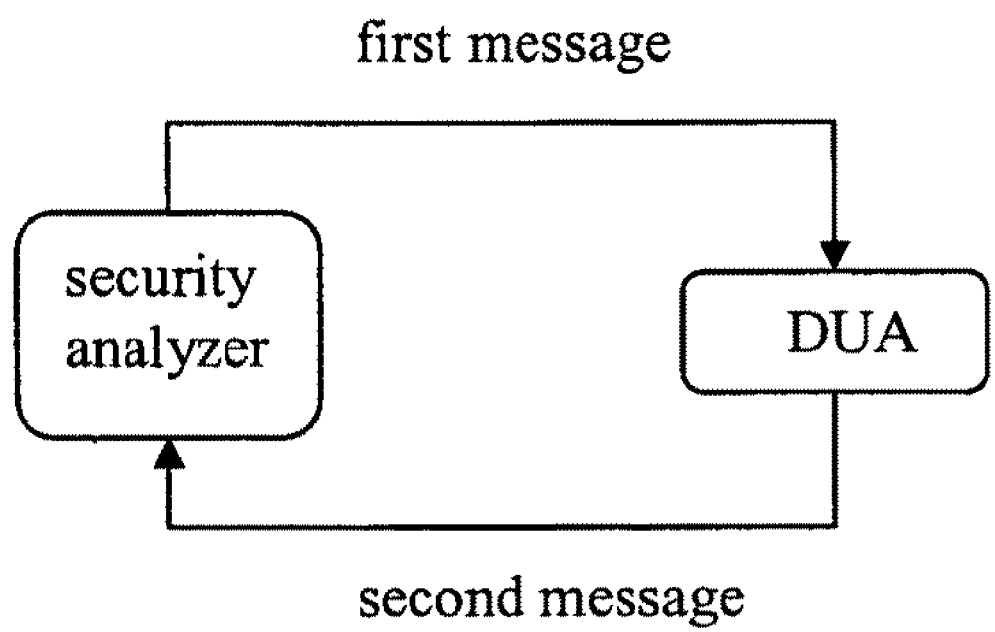
FIG. 1 illustrates a system that includes a security analyzer, a device-under-analysis, a first test message, and a second response message, according to one embodiment of the invention.

In the following description, "device", "device-under-analysis", and "DUA" represent software and/or hardware. Software includes, for example, applications, operating systems, and/or communications systems. Hardware includes, for example, one or more devices. A device can be, for example, a switch, bridge, router (including wireline or wireless), packet filter, firewall (including stateful or deep inspection), Virtual Private Network (VPN) concentrator, Network Address Translation (NAT)-enabled device, proxy (including asymmetric), intrusion detection/prevention system, or network protocol analyzer. A DUA can also be multiple devices that are communicatively coupled to form a system or network of devices. For example, a DUA can be two firewall devices that establish an encrypted tunnel between themselves. There can also be devices located between the security analyzer and the DUA, although FIG. 1 omits such devices for clarity.

In one embodiment, a security analyzer tests the communication protocols and/or channels of a device. A "protocol" refers to an exchange of data or messages in a known, structured format. Specifically, a protocol refers to what is being communicated (for example, the data or message content). A security analyzer can test various types of communication protocols, regardless of whether they are public or proprietary. Types of protocols include, for example, networking protocols (including network packets), application program interfaces (APIs; including API calls, remote method invocation (RMI), and remote procedure call (RPC)), and file formats. Appendix A contains exemplary networking protocols, APIs, and file formats.

A protocol generally has three characteristics: structure, semantics, and state. Therefore, when a security analyzer tests a protocol, it tests the protocol's structure, semantics, and/or state. Protocol structure refers to the layout of a message, such as its fields, arguments, or parameters, and its possible length. Protocol semantics refers to the context of a message, such as its actual content and what the content means. Protocol state refers to how the history of previous messages affects later messages. Appendix B contains types of attacks to test a protocol's structure, semantics, and/or state.

A "channel" refers to how protocol data is communicated. Specifically, a channel refers to how a message is delivered to a DUA (for example, using Ethernet on top of a wireless network). One example of a channel attack is sending too many messages at once, thereby flooding a network and resulting in a denial of service (DoS).

In one embodiment, a security analyzer can also test a DUA's overall security. These types of attacks include, for example, negotiating a lower (i.e., less secure) encryption algorithm, dictionary attacks (brute forcing commonly-used passwords), resource exhaustion, identifying misconfiguration of the DUA, identifying mechanisms for sending messages through the DUA that bypass various security checks, and detecting insecure implementations of standard protocols and information disclosure.

Although the embodiments below focus on an executable program for attacking a device by sending messages to it, the notion of a stand-alone program replacing a device or system can be used in many different situations. For example, rather than using a device or system that is complex, feature-rich, or more expensive, it can make sense to substitute a stand-alone program that is simpler, more portable, has fewer features, or is cheaper. Also, a compact or compiled stand-alone program can help protect proprietary information that might be more visible in a large system or device.

In one embodiment, the security analyzer and the executable program represent an attack internally as a context-free grammar or as an attribute grammar. The grammar specifies the syntax or structure of one or more messages to be sent to the DUA. If there are multiple messages, the grammar can also specify their order (for example, the order in which they should be sent to the DUA). In one embodiment, a grammar represents a set of messages that have a related syntax. In this embodiment, a grammar can be thought of as a message "template," and an actual message would be an instantiation of a grammar.

The grammar can be expressed in different ways. In one embodiment, the grammar is expressed using Backus Naur Form (BNF). In another embodiment, the grammar is expressed as a rooted graph. In one embodiment, if a graph represents multiple messages, then each message corresponds to a sub-graph within the larger graph. The way in which the sub-graphs are connected corresponds to the order of the messages.

Figure 2:
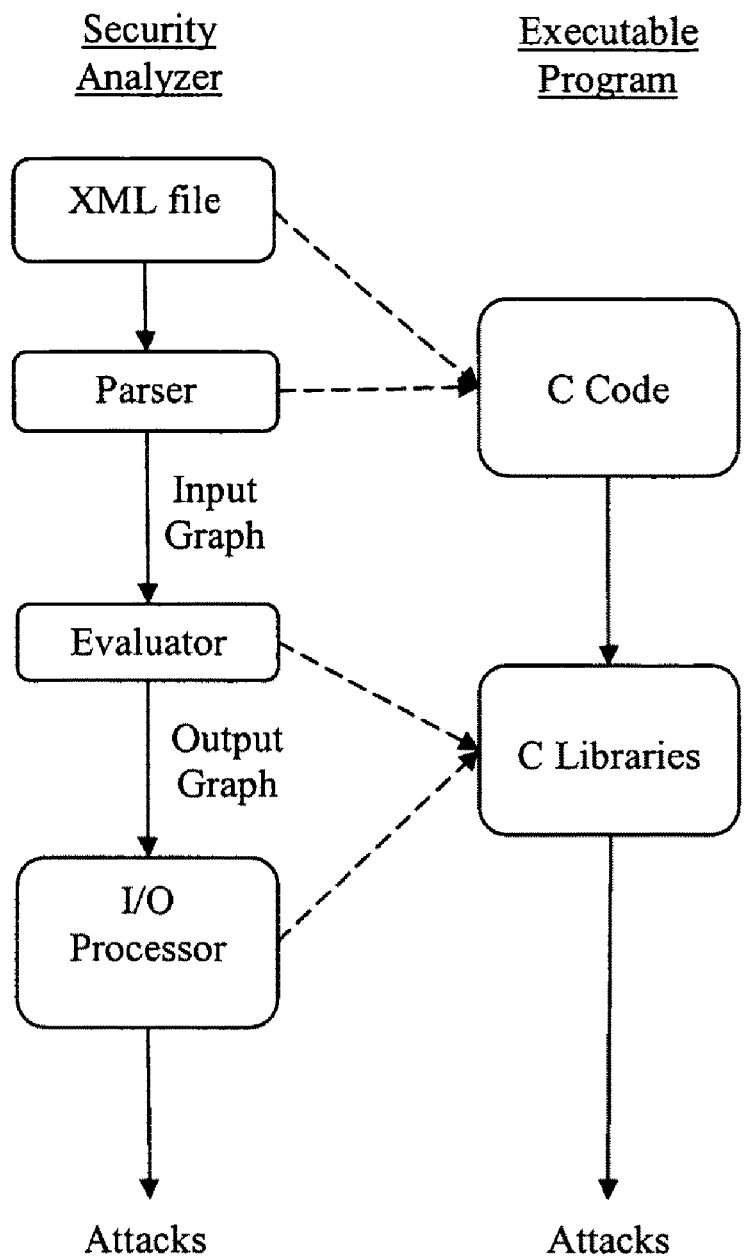
FIG. 2 illustrates a security analyzer capable of generating an attack, and also capable of generating a portable program that can generate the attack.

In one embodiment, shown in FIG. 2, the security analyzer generates a rooted graph automatically using a parsing program that parses an eXtensible Markup Language (XML) file. The XML file encodes knowledge of message syntax. In one embodiment, if self-describing messages are involved, the XML file is of a standard form such as a Document Type Definition (DTD) or an Interface Definition Language (IDL).

This rooted graph also references one or more rules. A rule specifies how to generate a semantic element of a message. For example, a checksum rule specifies how to compute an Internet Protocol (IP) checksum of a portion of a message. As another example, a compression rule specifies how to transform a portion of a message so that the portion is compressed. One example of a mal-formed message is a message where the value of a semantic element is incorrect or missing. For example, a semantic element that is supposed to represent the length of a portion of a message can have a negative value.

Once the rooted graph ("input graph") has been generated, it is evaluated. Evaluation comprises applying the various rules that are associated with the graph. For example, the rooted graph is traversed. At each node, the appropriate rule is invoked to generate a semantic element in order to build an output graph.

The output graph is then subjected to I/O processing in order to generate a final message to send to the DUA. In one embodiment, I/O processing generates a byte code according to a particular communication protocol, such as Transmission Control Protocol (TCP).

In summary, in one embodiment, the security analyzer generates a message as follows: An XML file is parsed to create an input graph. The input graph is evaluated to create an output graph. The output graph is I/O processed to create the message (i.e., attack).

Alternately, as shown in FIG. 2, an executable program can be used to generate the message. In one embodiment, the security analyzer generates the program. The program differs from the security analyzer in several ways. First, the program does not use an XML file and a parser to create an input graph. Instead, the program uses compiled code (e.g., C++ code) to create the input graph. Second, the program does not include an evaluator and I/O processing as such. Instead, the C++ code used to create the input graph is compiled with various libraries that provide the evaluation and I/O processing functionality.

In this way, the executable program shields its user from the internals of the security analyzer, including the XML file, the parser, the evaluator, and the I/O processor.

In one embodiment, the C++ code and libraries are compiled differently based on the environment in which the program will be run (for example, on a UNIX operating system versus a Microsoft Windows operating system).

In the preceding description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

What is claimed is:

1. A method for generating a security analysis test program for analyzing the vulnerability of a network device under analysis (DUA) to protocol abuse of a network protocol, comprising:

receiving captured network traffic from network communication according to the network communication protocol;

based on the received traffic, producing a model of the message syntax for the network communication protocol; and based on the model, automatically generating the executable security analysis test program, the program configured, when executed, to generate multiple attacks on the DUA, the attacks comprising sending intentionally malformed test message to the DUA.

2. The method of claim 1, further comprising:

generating, on a first system, based on the model, attacks on the DUA, the attacks comprising sending intentionally malformed test message to the DUA;

receiving response messages from the DUA to the attacks; and analyzing the attacks and response messages to identify an attack that triggers a vulnerability in the DUA.

3. The method of claim 2, further comprising:

executing the executable program on a second system so as to regenerate the attacks on the DUA and to reproduce the security vulnerability in the DUA.

4. The method of claim 1, wherein the model comprises a graph model representing the message syntax of the network communication protocol.

5. The method of claim 4, further comprising:

parsing a description of the message syntax of the network communication protocol to generate the graph model.

6. The method of claim 5, wherein the description of the message syntax further comprises a file in eXtensible Markup Language (XML) format.

7. The method of claim 6, wherein a format of the file includes at least one of Document Type Definition (DTD) or Interface Definition Language (IDL).

8. The method of claim 4, further comprising:

traversing the graph model to generate the attacks.

9. The method of claim 8, wherein each of the malformed test messages is represented by a sub-graph within the graph, and the malformed test messages are sent to the DUA in the order that said sub-graphs are connected to each other in the output graph.

10. The method of claim 1, wherein the model further comprises rules specifying semantic elements for a message in the communication protocol.

11. The method of claim 10, further comprising:
generating attacks by using the rules to generate a semantic element in a test message with an incorrect or missing value.

12. The method of claim 1, wherein the executable program is configured to generate test messages with a semantic element having an incorrect or missing value.

13. An article of manufacture comprising a non-transitory computer readable storage medium, a computer-readable recording medium, or computer readable storage device having stored thereon a series of computer executable instructions, the instructions configured, when executed by a processor, that cause the performance of a method for generating a security analysis test program for analyzing the vulnerability of a network device under analysis (DUA) to protocol abuse of a network protocol, the method comprising:
receiving captured network traffic from network communication according to the network communication protocol;
based on the received traffic, producing a model of the message syntax for the network communication protocol; and
based on the model, automatically generating the executable security analysis test program, the program configured, when executed, to generate multiple attacks on the DUA, the attacks comprising sending intentionally malformed test message to the DUA.

14. The article of manufacture of claim 13, wherein the method further comprises:
generating, on a first system, based on the model, attacks on the DUA, the attacks comprising sending intentionally malformed test message to the DUA;
receiving response messages from the DUA to the attacks; and
analyzing the attacks and response messages to identify an attack that triggers a vulnerability in the DUA.

15. The article of manufacture of claim 14, wherein the method further comprises:
executing the executable program on a second system so as to regenerate the attacks on the DUA and to reproduce the security vulnerability in the DUA.

16. The article of manufacture of claim 13, wherein the model further comprises rules specifying semantic elements for a message in the communication protocol.

17. The article of manufacture of claim 16, wherein the method further comprises:
generating attacks by using the rules to generate a semantic element in a test message with an incorrect or missing value.

18. A security analyzer for analyzing the vulnerability of a network device under analysis (DUA) to protocol abuse of a network protocol, comprising:
a parsing program stored on the security analyzer and configured to process a model of message syntax for messages in the network protocol;
an I/0 processor configured to generate and send test messages to the DUA based on the model, the test messages including intentionally malformed messages; and
an executable program generation module configured to output an executable program based on the model that is configured, when executed, to generate intentionally malformed messages to be sent as test cases to a DUA.

19. The system of claim 18, wherein the security analyzer is further configured to receive response messages from the DUA in response to the attacks.

20. The security analyzer device of claim 18, wherein the model of the message syntax further comprises a file in eXtensible Markup Language (XML) format.

21. The security analyzer device of claim 20, wherein a format of the file includes at least one of Document Type Definition (DTD) or Interface Definition Language (IDL).

22. The security analyzer of claim 18, wherein the model comprises rules specifying semantic content of a message in the protocol, and wherein the I/0 generator is further configured to generate attacks by using the rules to generate a semantic element in a message with an incorrect or missing value.

23. The security analyzer of claim 22, wherein the executable program generation module is further configured to output an executable program based on the model that is configured, when executed, to generate a message that has a semantic element with an incorrect or missing value.

* * * * *